United States Patent [19]

Halmosi et al.

[11] 4,043,610
[45] Aug. 23, 1977

[54] TRACK SHOE

[75] Inventors: Rudolph Halmosi, Hudson; Karl W. Schneider, Parma; John F. Weidman, Willoughby Hills, all of Ohio

[73] Assignee: General Motors Corporation, Detroit, Mich.

[21] Appl. No.: 716,520

[22] Filed: Aug. 23, 1976

[51] Int. Cl.² .............................................. B62D 55/28
[52] U.S. Cl. .................................. 305/19; 305/35 EB
[58] Field of Search .................. 305/35 EB, 35 R, 13, 305/19, 54, 53, 55; 152/176, 179, 182, 191; 301/43, 44 R, 44 T, 44 B; D15/28, 24

[56] References Cited
U.S. PATENT DOCUMENTS

| 2,964,361 | 12/1960 | Hansen | 305/54 |
| 3,477,768 | 11/1969 | Culver | 305/54 |
| 3,857,617 | 12/1974 | Grawey | 305/38 |
| 3,964,797 | 6/1976 | Swanson | 305/54 |

Primary Examiner—Robert B. Reeves
Assistant Examiner—John P. Shannon
Attorney, Agent, or Firm—Edward J. Biskup

[57] ABSTRACT

A ground engaging shoe for the cushioned track of an off-highway vehicle that is generally rectangular in shape and includes a V-shaped main grouser that is bounded on the opposite sides thereof by a pair of secondary grousers, each of which has a body portion that is substantially parallel to one of the arms of the main grouser.

3 Claims, 4 Drawing Figures

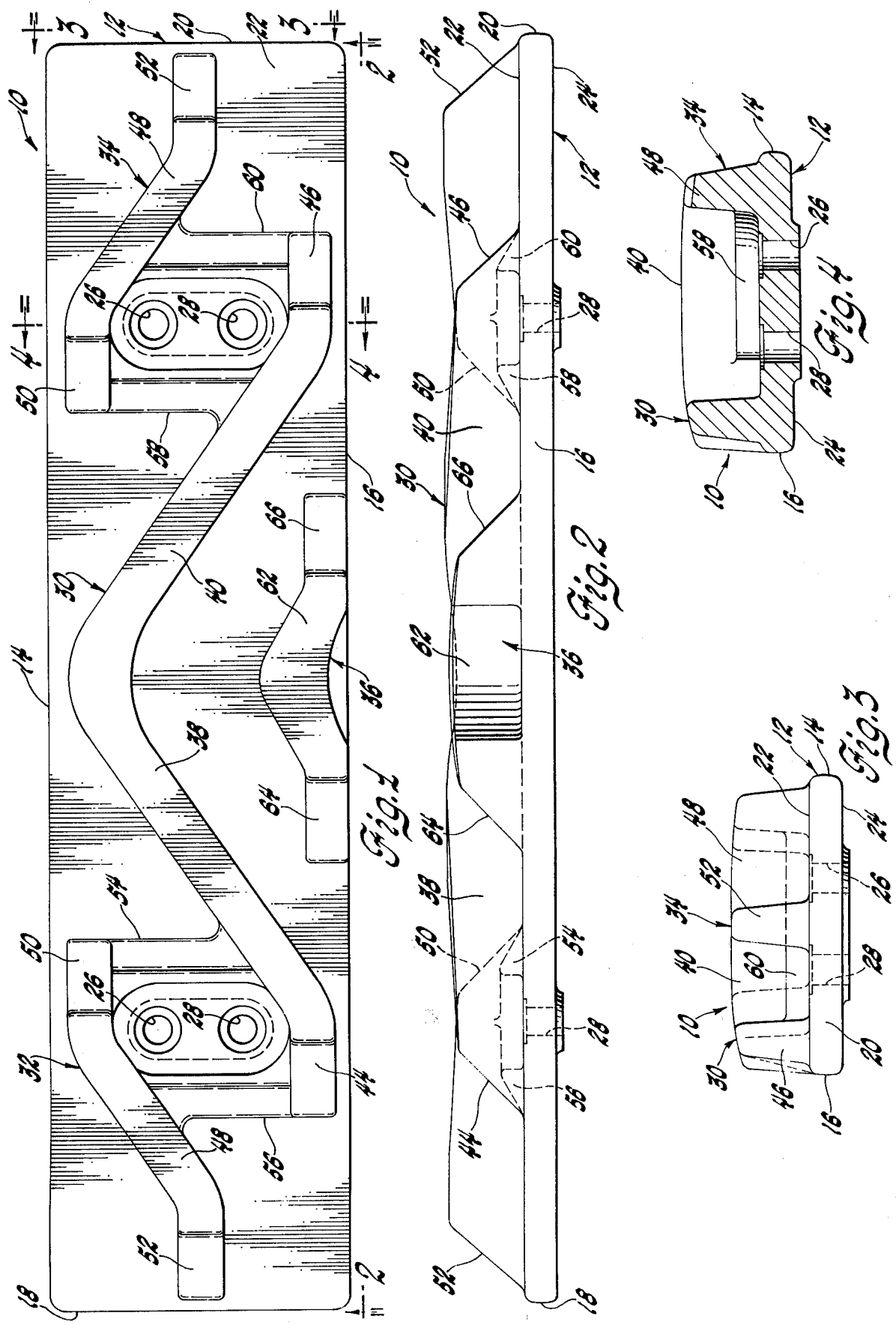

TRACK SHOE

This invention concerns track shoes and more particularly relates to a rigid track shoe that is employed with an endless track that completely surrounds the peripheral portion of a large pneumatic tire.

In the preferred form, the track shoe, according to the invention, includes a flat base plate having a front edge, a rear edge, and a pair of side edges. A V-shaped main grouser has the apex portion thereof located at the center of the base plate adjacent the front edge and has each arm thereof extending rearwardly and terminating with intergral end portions located adjacent the rear edge. A pair of identical secondary grousers are located on the opposite sides of the main grouser adjacent the side edges of the base plate. Each of the secondary grousers has the body portion thereof located substantially parallel to the adjacent arm of the main grouser and serves to cooperate therewith for resisting lateral slippage when engaging the ground. In addition, a stub grouser is provided at the center of the plate adjacent the rear edge and takes the form of a "V" with the arms thereof substantially parallel to the corresponding arms of the main grouser.

The objects of the present invention are to provide a new and improved ground engaging shoe for a cushioned track having grousers shaped so as to provide a self-cleaning action; to provide an improved ground engaging shoe having grousers that are used with an endless track on a rubber-tired vehicle and are characterized by being crowned in transverse section so as to minimize vibration when the vehicle is driven over hard surfaces; to provide an improved ground engaging shoe having grousers located on the opposite sides of the mounting bolts for protecting the latter from damage; and to provide an improved ground engaging shoe for a rubber tire in which the outer surface of the grousers in transverse section is arcuate in shape and is loated on an arc having its center at the same point as the rotational center of the tire.

Other objects and advantages of the present invention will be more apparent from the following detailed description when taken with the drawings in which:

FIG. 1 is a plan view showing a track shoe made in accordance with the invention, FIG. 2 is an elevation rear view of the track shoe of FIG. 2 taken on lines 2—2, FIG. 3 is an end view of the track shoe taken on line 3—3 of FIG. 1, and FIG. 4 is a sectional view of the track shoe taken on line 4—4 of FIG. 1.

Referring to the drawing and more particularly FIGS. 1 and 2 thereof, a ground engaging track shoe 10 according to the invention is shown which is intended to be combined with a series of identical track shoes for providing an endless track that surrounds the rubber tire of an off-highway earthmoving vehicle. As can be seen, the track shoe 10 comprises a flat rectangular base plate 12 which is defined by a front edge 14, rear edge 16, sides edges 18 and 20, top planar surface 22 and a bottom planar surface 24. The base plate 12 includes a pair of cylindrical holes 26 and 28 adjacent each side edge. Each hole is adapted to receive a mounting bolt for securing the shoe 10 to an endless track, which in turn, is adapted to be fixedly connected to the peripheral portion of the rubber tire. Each pair of holes 26 and 28 are spaced from the adjacent side edge the same distance and are located along an axis perpendicular to the front and rear edges 14 and 16.

The top surface 22 of the base plate 12 is integrally formed with a main grouser 30, a pair of identical secondary grousers 32 and 34, and a stub grouser 36. More specifically, the main grouser 30 is generally V-shaped and includes a pair of arms 38 and 40 which intersect at a point located adjacent to the front edge 14. The arms 38 and 40 of the main grouser 30 terminate with end portions 44 and 46 respectively, both of which are located adjacent the rear edge 16 of the base plate 12. The end portions 44 and 46 generally parallel to the rear edge 16 and are inclined downwardly towards the surface 22 as seen in FIG. 2.

The secondary grousers 32 and 34 are located on the opposite sides of the main grouser 30 and are identical in configuration except that they are mirror images of each other. In this regard, it will be noted that each of the secondary grousers 32 and 34 includes a body portion 48 which is substantially parallel to the adjacent arm of the main grouser 30. Also, as seen in FIG. 2, each of the secondary grousers 32 and 34 terminates with end portions 50 and 52 which are inclined towards the base plate 12 in a manner similar to the end portions 44 and 46 formed with main grouser 30.

The arms 38 and 40 of the main grouser 30 are connected to the secondary grousers 32 and 34 by side walls 54, 56 and 58, 60 respectively, which as seen in FIG. 3, are of a height less than half the height of the main grouser 30 and secondary grousers 32 and 34. Each pair of side walls together with the adjacent arm of the main grouser 30 and the associated secondary grouser provide a well in which the holes 26 and 28 for the mounting bolts are located. As should be apparent, the side walls and the associated grouser portions cooperate to provide a shield which serves to protect the mounting bolts from damage when the track shoe is in use.

In addition to the main and secondary grousers described above, the track shoe 10 is integrally formed with the stub grouser 36 which has a main body portion 62 that is generally V-shaped and terminates with end portions 64 and 66 located at the rear edge 16 of the base plate 12. As seen in FIG. 2, the end portions 64 and 66 are inclined downwardly in a manner similar to the end portions incorporated with the main and secondary grousers. Due to the shape and location of the grousers, the upper surface thereof appears in a wave form as seen in FIG. 2. However, it will be noted that the portions of the main grouser 30, and the secondary grousers 32 and 34 along a center axis extending longitudinally of the track shoe are of a uniform height and have the upper surface thereof along this axis located in a plane that is parallel to the top surface 22 of the base plate 12. As seen in FIGS. 3 and 4, the top surfaces of the main grouser 30, secondary grousers 32 and 34 and the stub grouser 36 are curved and lie on an arc the center of which would be located at the center of the rotational axis of the tire which supports the track shoe 10. This design accounts for the wave form seen in FIG. 2. Thus, the top surface of the three grousers in transverse cross section is crowned so as to permit the vehicle to be operated over hard surfaces with a minimum of vibration being transmitted to the vehicle.

Various changes and modifications can be made in this construction without departing from the spirit of the invention. Such changes and modifications are contemplated by the inventors and they do not wish to be limited except by the scope of the appended claims.

We claim:

1. A ground engaging shoe for a cushioned track, said shoe comprising a flat base plate having a front edge, rear edge, and a pair of side edges, a V-shaped main grouser with the apex thereof located at the center of said plate adjacent the front edge and with each arm thereof extending rearwardly and terminating adjacent to said rear edge, a pair of identical secondary grousers located on the opposite sides of the main grouser adjacent said front edge, each of said secondary grousers having a pair of end portions interconnected by an intermediate portion that is substantially parallel to the adjacent arm of the main grouser and cooperates therewith for resisting lateral slippage of said shoe when engaging the ground, and a stub grouser located at said center of said plate adjacent said rear edge, said stub grouser having a V-shaped main body portion and having the ends thereof terminating with a pair of end portions which are adjacent to said rear edge, each of said grousers being of a uniform height and having the top surfaces thereof lying in a plane parallel to the plane of the base plate when viewed from the front edge and being curved when viewed from either of the side edges.

2. A ground engaging shoe for a cushioned track, said shoe comprising a flat base plate having a front edge, a rear edge, and a pair of side edges, a V-shaped main grouser with the apex thereof located at the center of said plate adjacent the front edge and with each arm thereof extending rearwardly and terminating with an integral end portion which is adjacent to said rear edge, a pair of identical secondary grousers located on the opposite sides of the main grouser adjacent said front edge, each of said secondary grousers having a pair of end portions interconnected by an intermediate portion that is substantially parallel to the adjacent arm of the main grouser and cooperates therewith for resisting lateral slippage of said shoe when engaging the ground, a stub grouser located at said center of said plate adjacent said rear edge, said stub grouser having a V-shaped main body portion and having the ends thereof terminating with a pair of end portions which are adjacent to said rear edge, and at least one bolt hole formed in said base plate adjacent each side edge and being located between the secondary grouser and the main grouser for bolting said shoe to said track.

3. A ground engaging shoe for a cushioned track, said shoe comprising a flat base plate having a front edge, a rear edge, and a pair of side edges, a V-shaped main grouser with the apex thereof located at the center of said plate adjacent the front edge and with each arm thereof extending rearwardly and terminating with an integral end portion which is adjacent to said rear edge, a pair of identical secondary grousers located on the opposite sides of the main grouser adjacent said front edge, each of said secondary grousers having a pair of end portions interconnected by an intermediate portion that is substantially parallel to the adjacent arm of the main grouser and cooperates therewith for resisting lateral slippage of said shoe when engaging the ground, a stub grouser located at said center of said plate adjacent said rear edge, said stub grouser having a V-shaped main body portion and having the ends thereof terminating with a pair of end portions which are adjacent to said rear edge, a bolt hole formed in said base plate adjacent each said side edge and being located between the secondary grouser and the main grouser, and a pair of side walls connecting each secondary grouser with the main grouser and being located on opposite side of said bolt hole.

* * * * *